July 24, 1956  E. OUTREBON  2,756,041
AUTOMATIC WEIGHING MACHINE
Filed Aug. 2, 1952  17 Sheets-Sheet 1
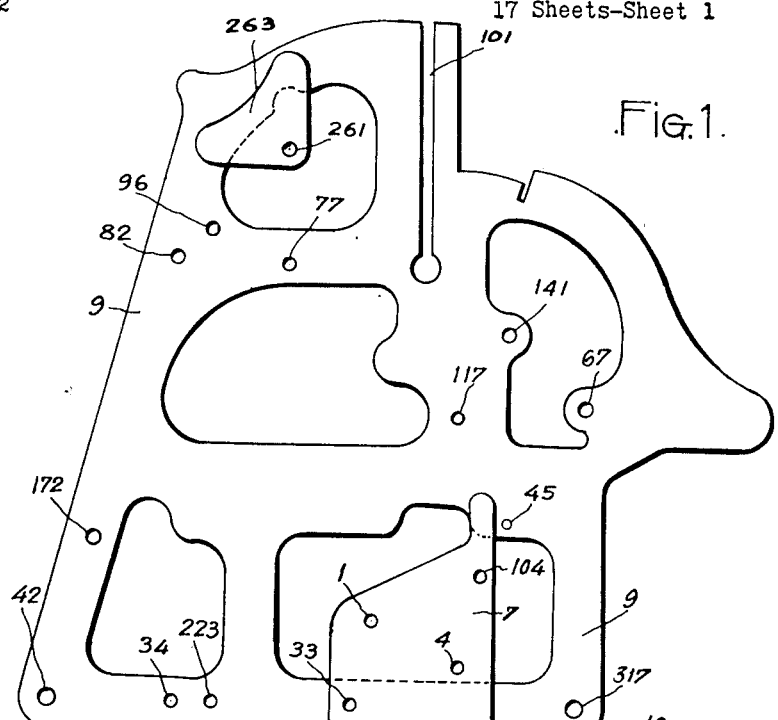
Fig.1.
Fig.2
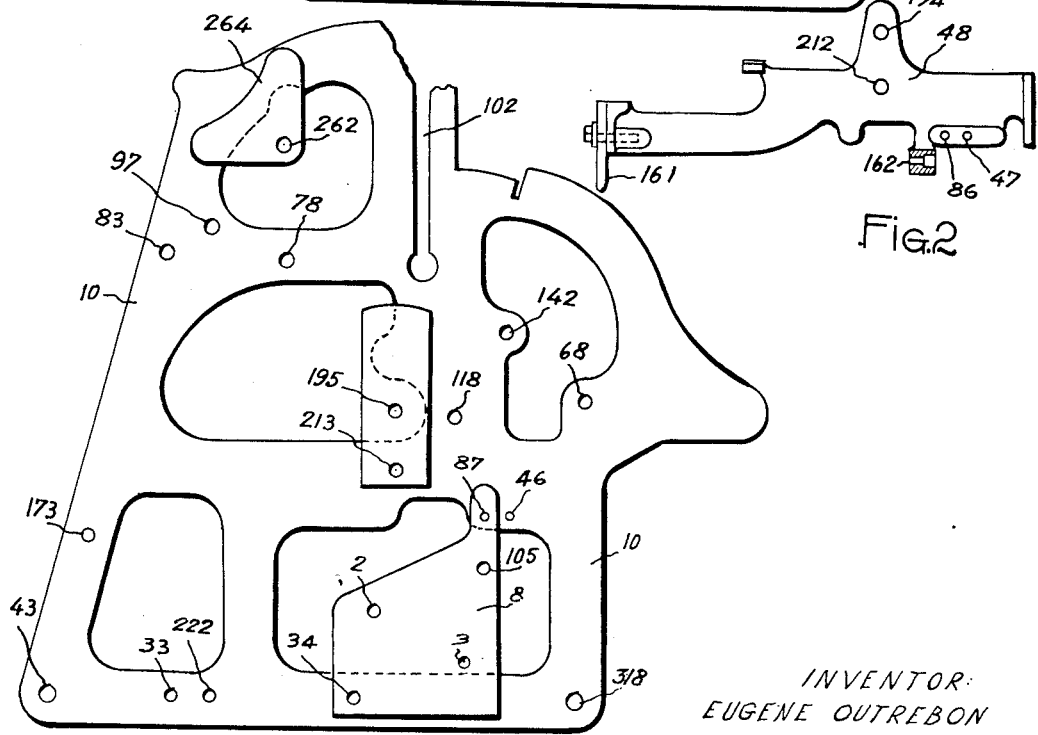
Fig.3.
INVENTOR:
EUGENE OUTREBON
by
Richardson, David and Nardon
HIS ATTYS.

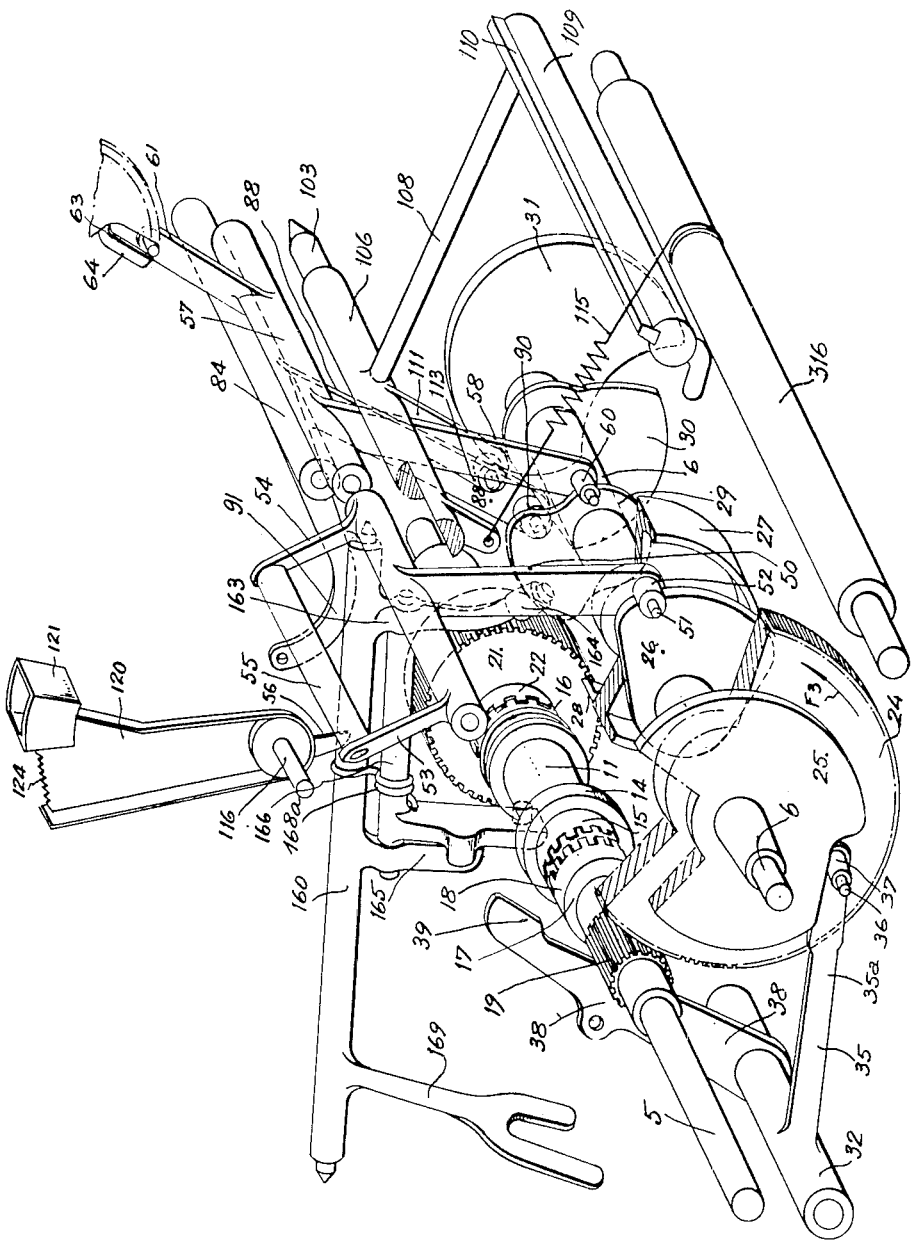

July 24, 1956 E. OUTREBON 2,756,041
AUTOMATIC WEIGHING MACHINE
Filed Aug. 2, 1952 17 Sheets-Sheet 3

INVENTOR:
EUGENE OUTREBON
By
Richardson, David and Nordon
HIS ATTYS.

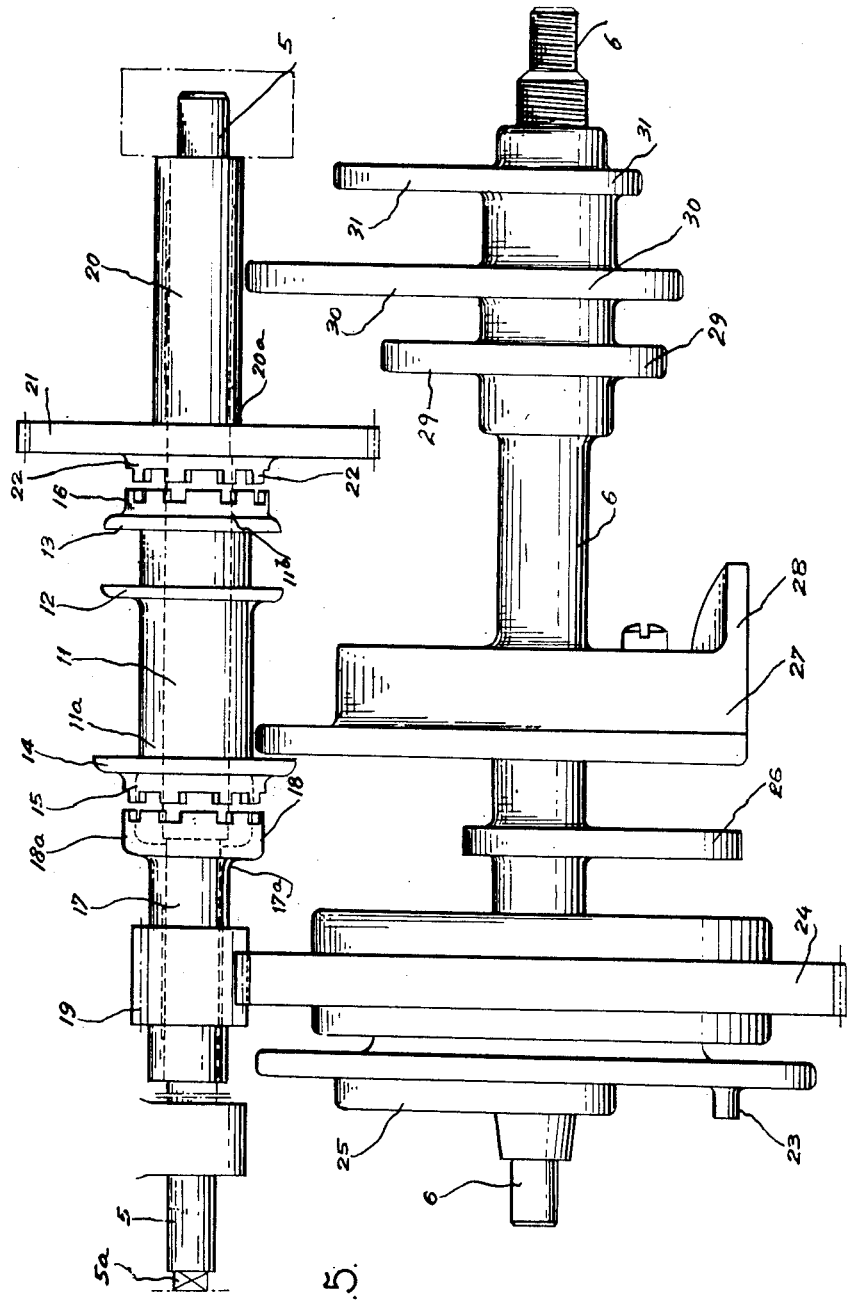

July 24, 1956  E. OUTREBON  2,756,041
AUTOMATIC WEIGHING MACHINE
Filed Aug. 2, 1952  17 Sheets-Sheet 5
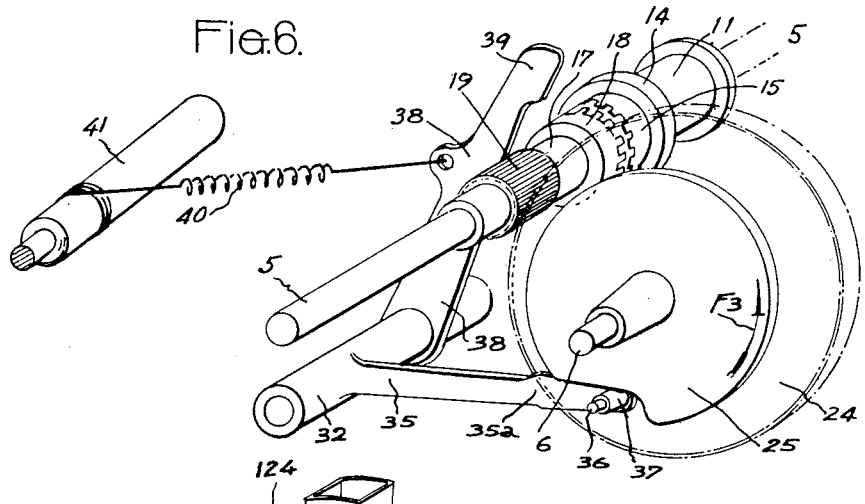
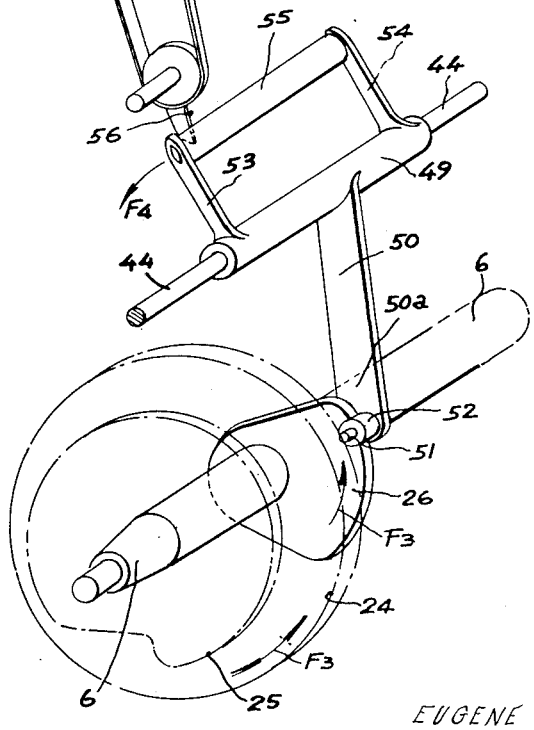
INVENTOR:
EUGENE OUTREBON
By Richardson, David and Nordon
His Atty's.

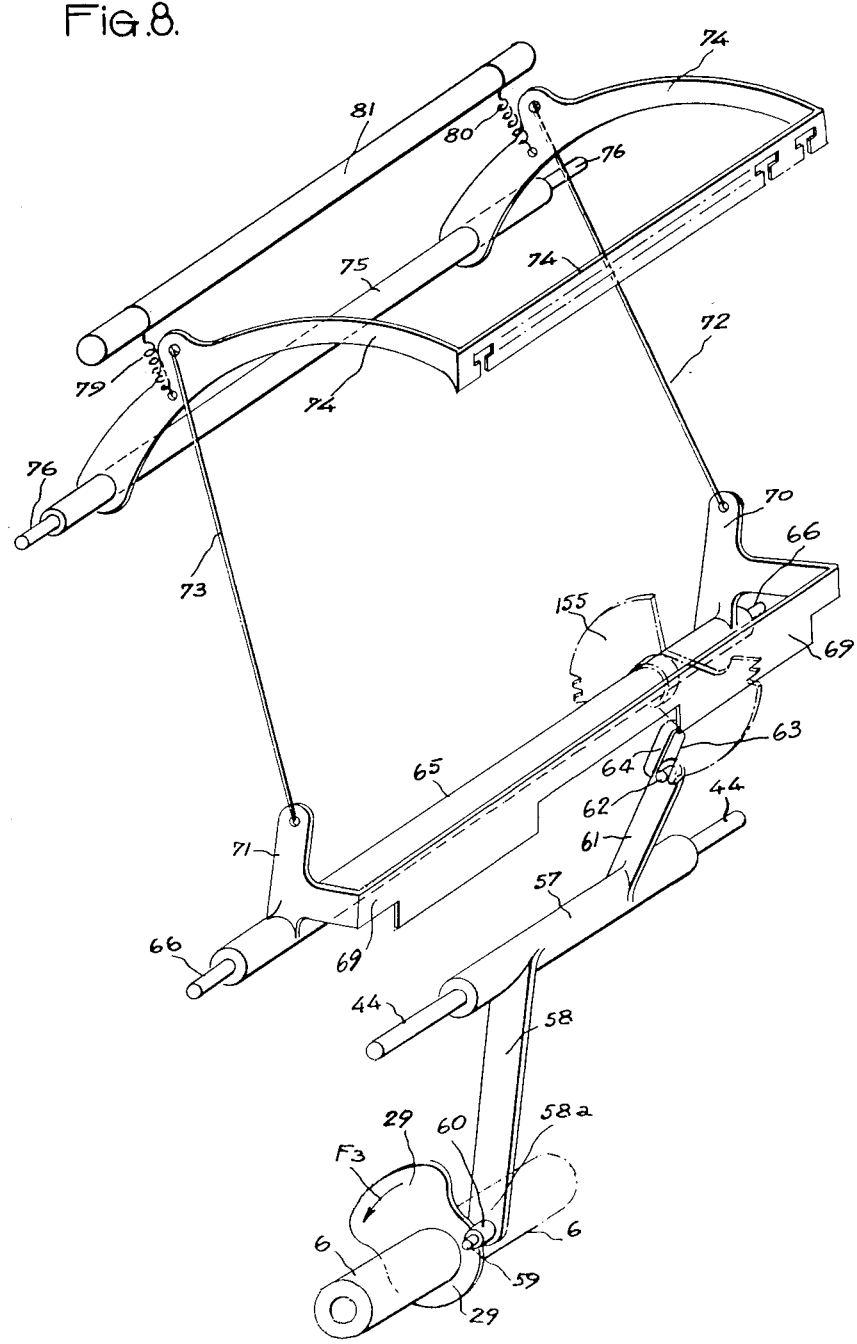

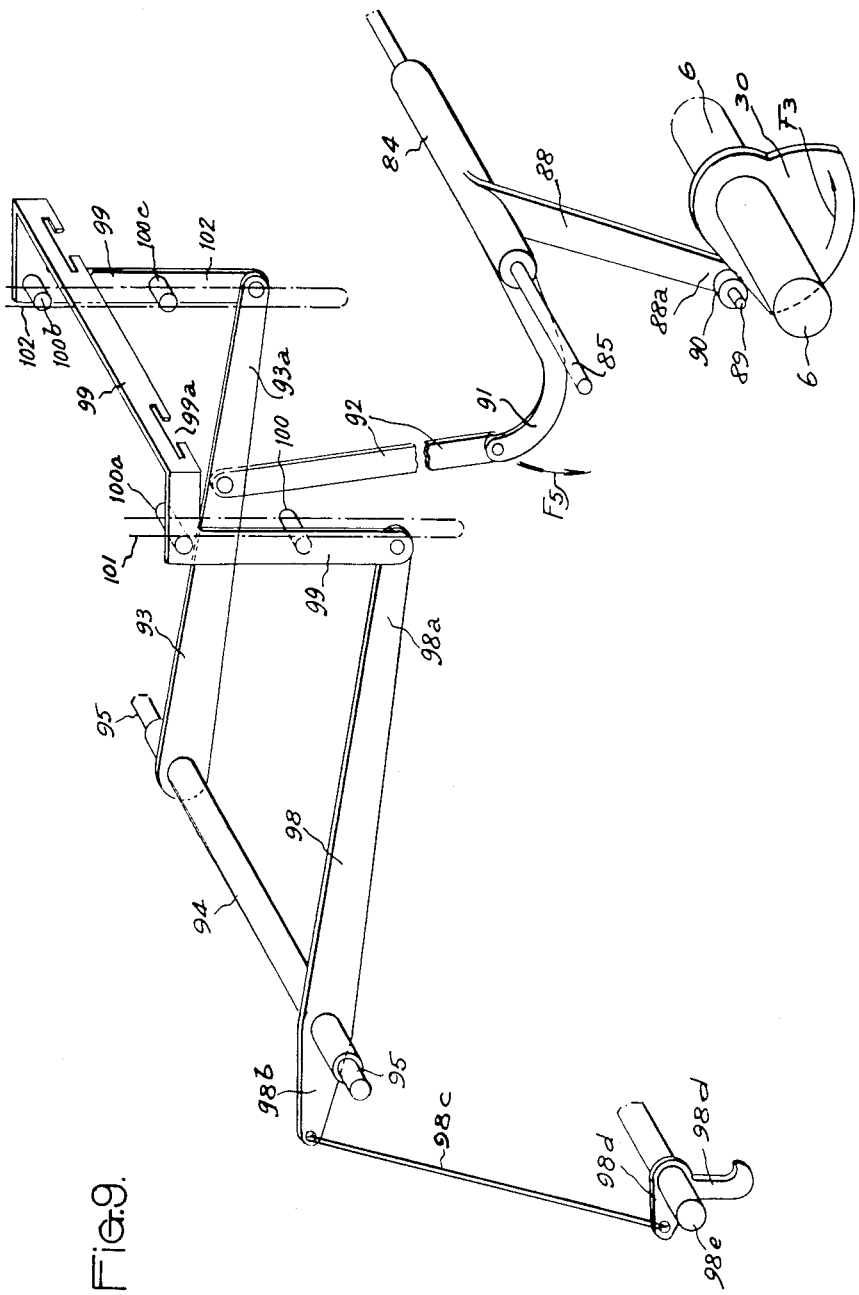

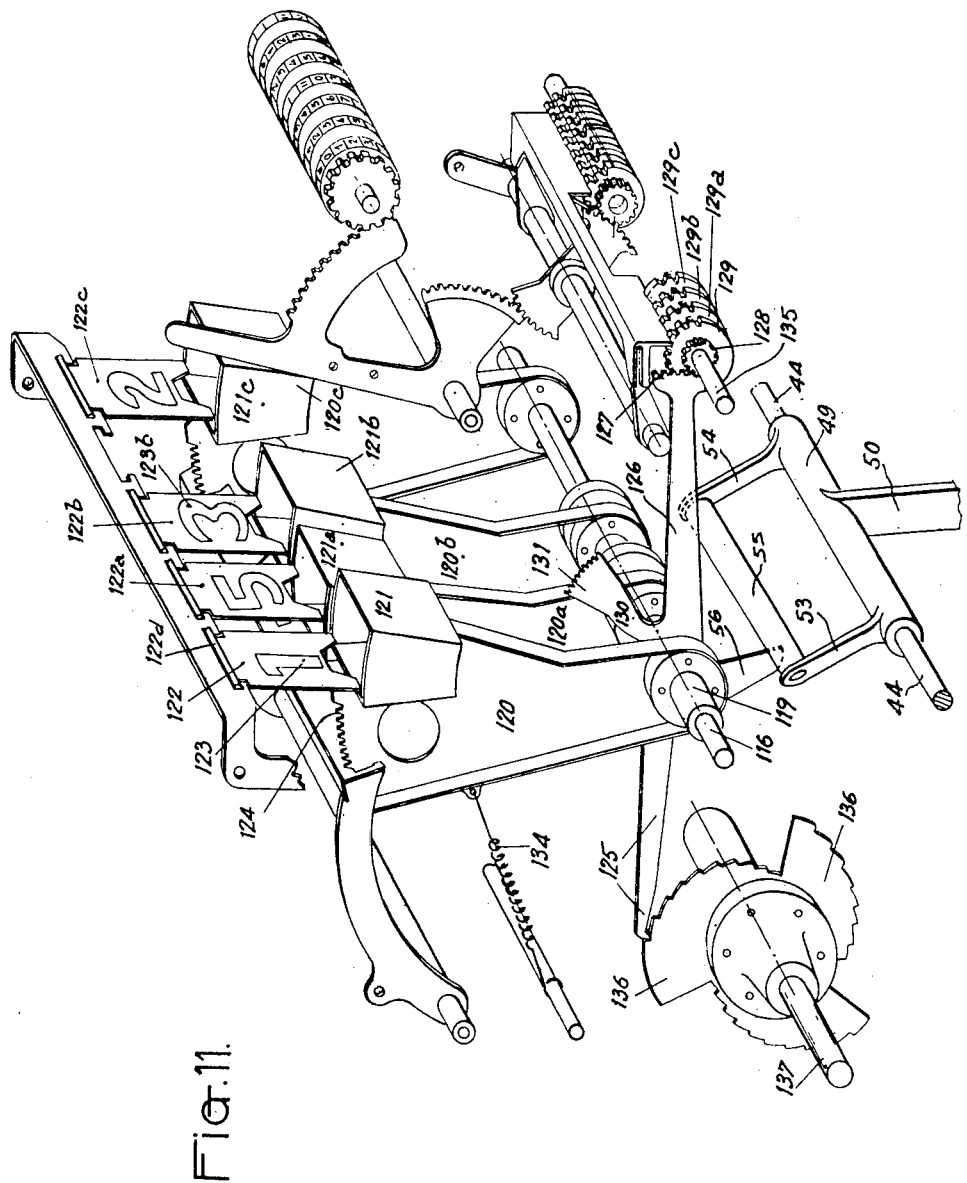

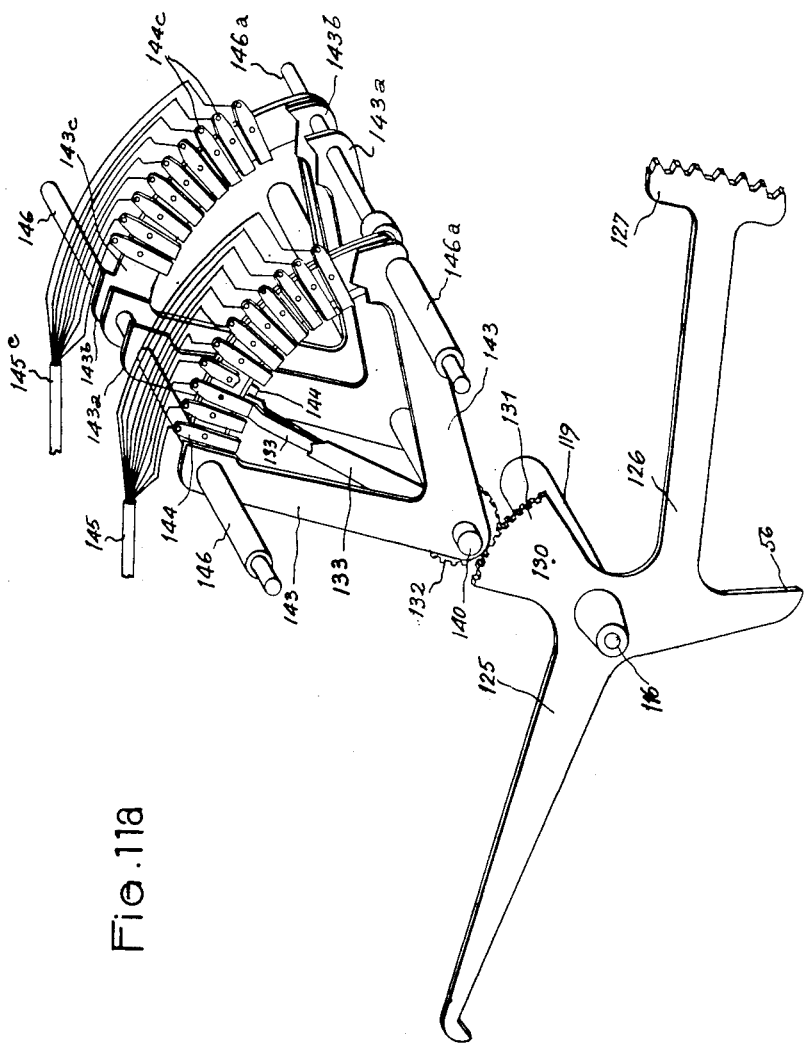

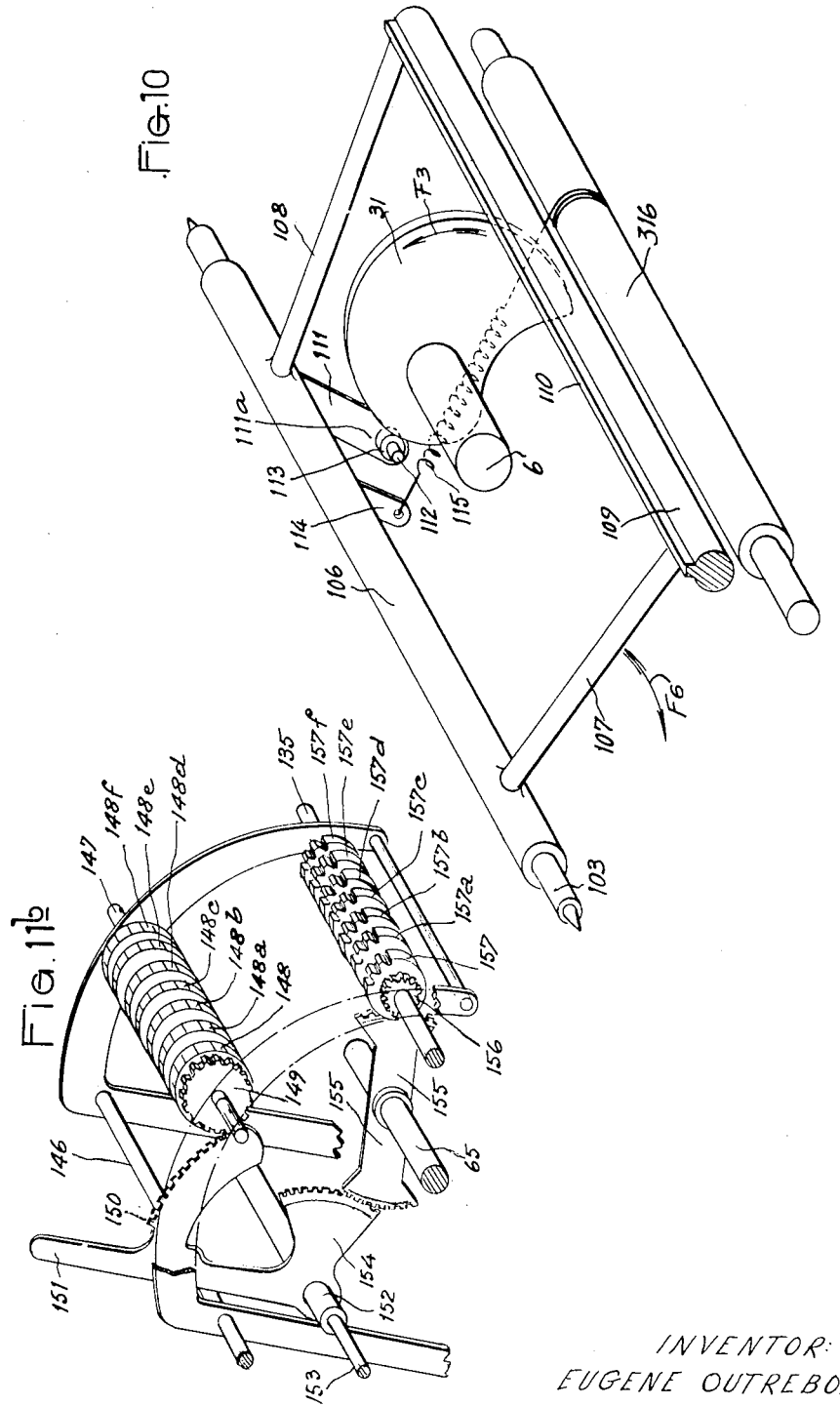

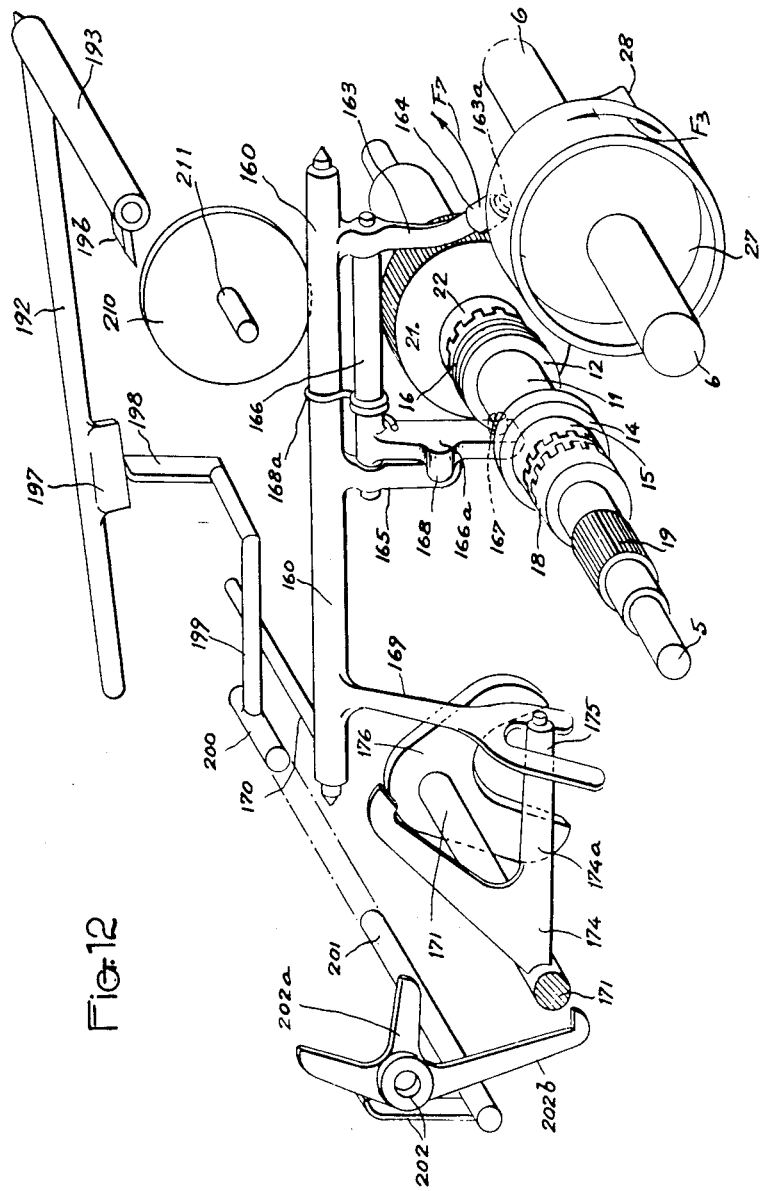

July 24, 1956 E. OUTREBON 2,756,041
AUTOMATIC WEIGHING MACHINE
Filed Aug. 2, 1952 17 Sheets-Sheet 12

INVENTOR:
EUGENE OUTREBON
BY
Richardson, David and Nordon
HIS ATTYS.

July 24, 1956
E. OUTREBON
2,756,041
AUTOMATIC WEIGHING MACHINE
Filed Aug. 2, 1952
17 Sheets-Sheet 13
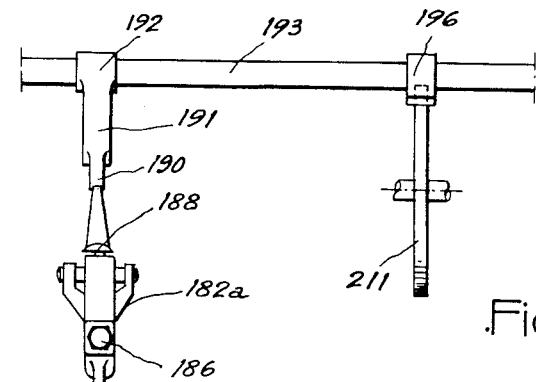
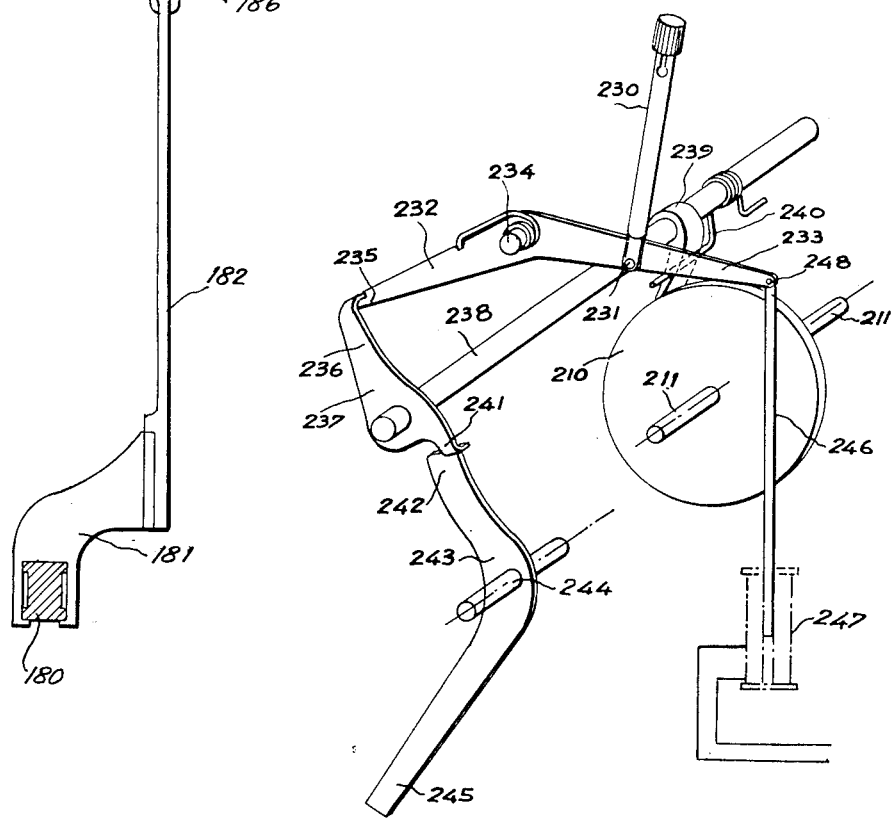
INVENTOR:
EUGENE OUTREBON
By
Richardson, David and Nordon
HIS ATTYS.

July 24, 1956          E. OUTREBON          2,756,041
AUTOMATIC WEIGHING MACHINE
Filed Aug. 2, 1952          17 Sheets-Sheet 14
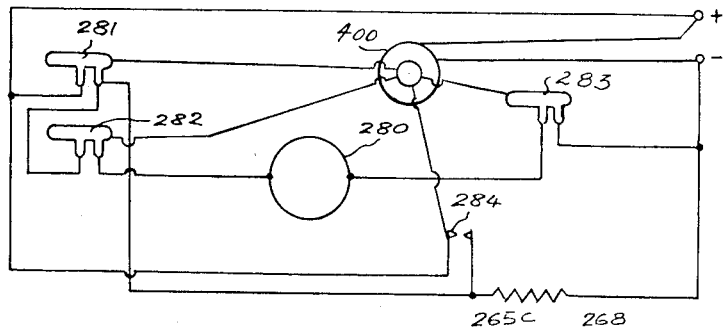
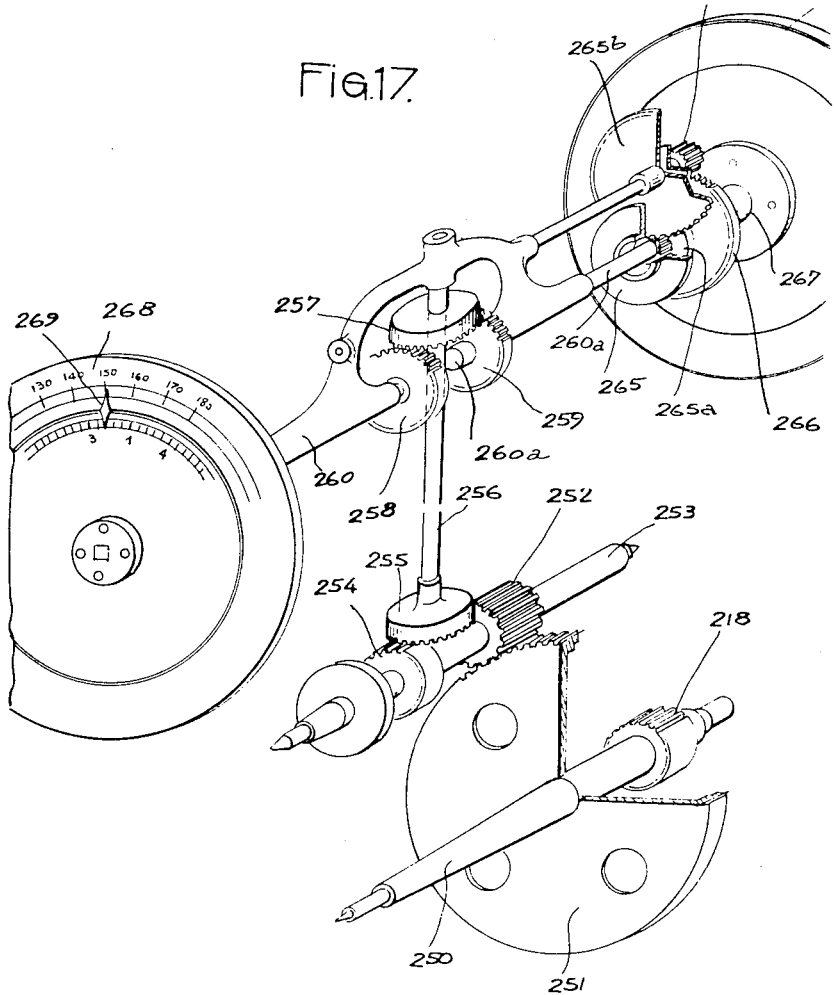
INVENTOR:
EUGENE OUTREBON
By Richardson, David and Nordon
HIS ATTY'S

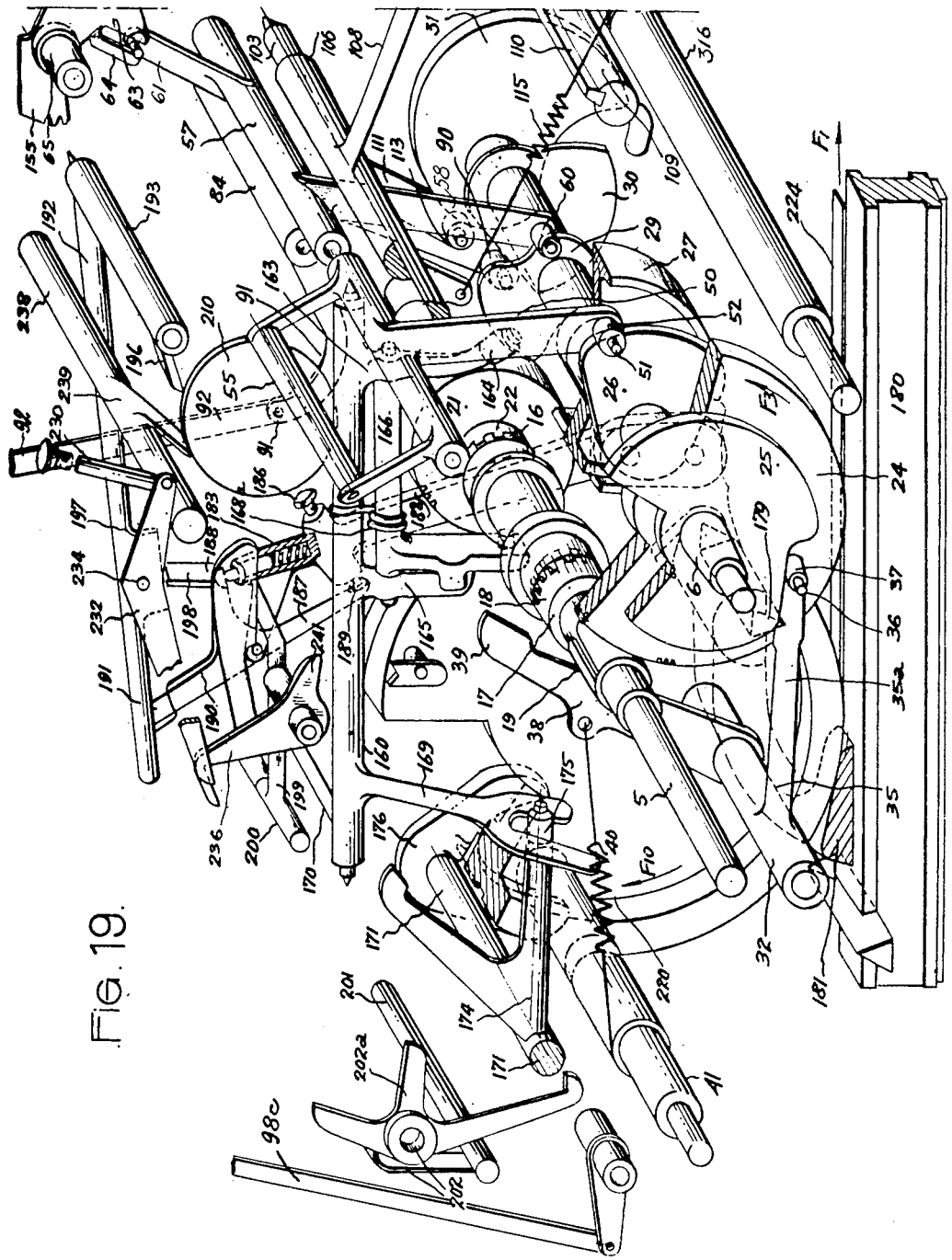

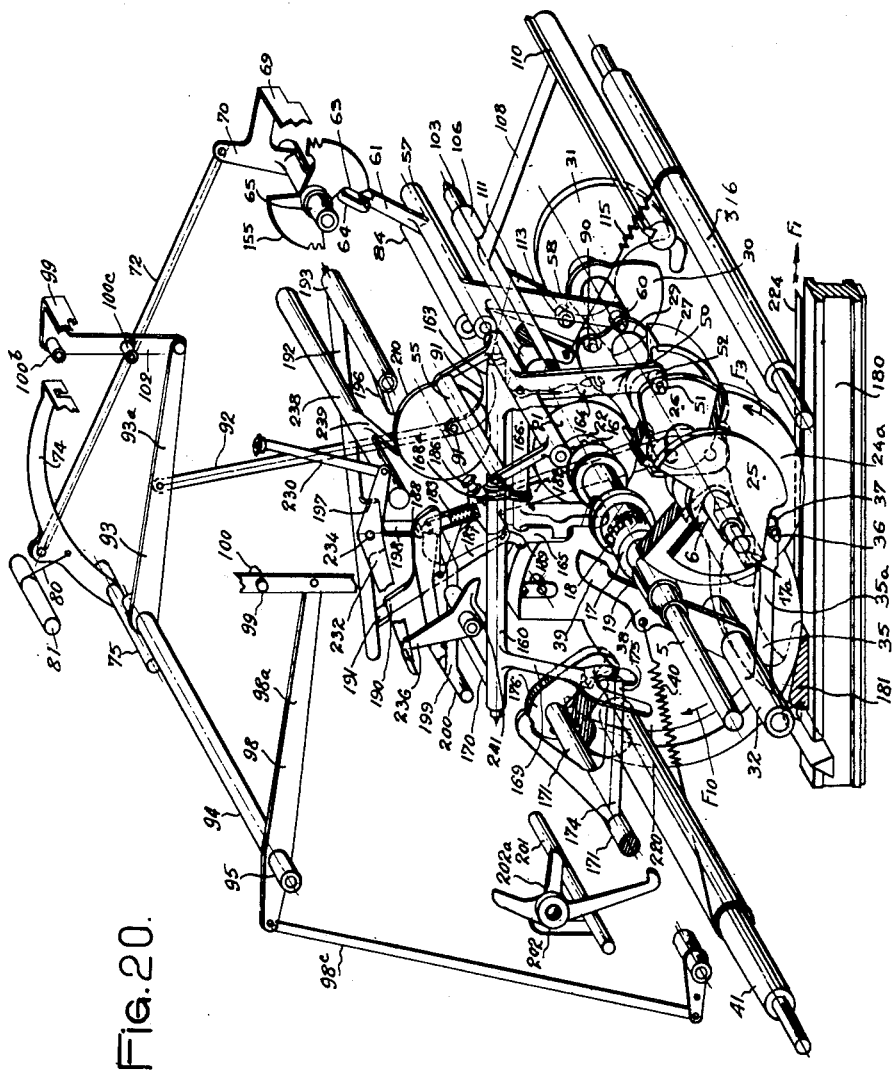

July 24, 1956  E. OUTREBON  2,756,041
AUTOMATIC WEIGHING MACHINE
Filed Aug. 2, 1952  17 Sheets-Sheet 17

INVENTOR:
EUGÉNE OUTREBON
BY
Richardson, David and Vardon
HIS ATTYS.

United States Patent Office 2,756,041
Patented July 24, 1956

2,756,041
AUTOMATIC WEIGHING MACHINE

Eugene Outrebon, Bethune, Pas-de-Calais, France

Application August 2, 1952, Serial No. 302,320

Claims priority, application France May 12, 1947

10 Claims. (Cl. 265—7)

Automatic steelyards are already known, in which a self-sliding weight, driven by a driving drum, moves along the beam and acts during its displacement, through a transmission member on a mechanism ensuring the regulation then the slowing down of the displacement speed. The regulation and slowing down mechanism is, in addition, controlled by a release device associated with the beam, the pivoting of which, during the displacement of the self sliding weight, triggers a device which controls a clutch causing the putting in operation of a brake, then, finally, the stopping of the mechanism of the scale when the beam is balanced.

The transmission member between the self sliding weight and the regulation mechanism consists of a tape associated, on the one hand, with the self sliding weight and, on the other hand, with a development wheel on which it is wound when the scale is at rest. The development wheel is connected, through gears, with a slug type regulator ensuring a regular displacement of the self sliding weight during its high speed run. During this displacement, the beam pivots gently and this motion releases the triggering device which acts on a clutch engaging a brake. The brake is usually constituted in this automatic weighing machine, by a propeller rotating in air and being in connection with a development wheel through a gear train. The rotation of the propeller in air stops the development wheel.

The present invention aims at mechanisms ensuring, when the self sliding weight effects a balance of the beam, a stopping of the weighing mechanism of the scale by a device called a "releasing device" which acts on a shoe comprising a pawl which is disengaged from another pawl on which it was resting; the second pawl then causes the fall of a catch stopping the mechanism of the scale.

According to other characteristics of the invention, mechanisms ensure the control of visual indicators of the weight measured by the scale, the transmission at a distance of this visual indication, the printing of this weight on a ticket or a band, and the bringing back to rest of the whole scale, i. e. the weighing mechanism and the indicating and printing mechanisms.

Various other characteristics of the invention will appear from the following detailed description.

One form of embodiment of the object of the invention is represented, by way of example, in the appended drawings.

Figure 1 is a side elevation of the front plate of the machine.

Figure 2 is a side elevation of the central plate.

Figure 3 is a side elevation of the back plate.

Figure 4 is a view, in perspective, on a larger scale, of part of weighing machine mechanism according to the invention, the various elements of which are represented in the positions they occupy when the machine is completely assembled, the front, central and back flanges not being represented.

Figure 4b is a section along a line IVb—IVb of Figure 4a.

Figure 5 is a top plan view, on a larger scale, of the shaft carrying the double clutch and of the cam shaft.

Figure 6 is a view, in perspective, of the locking device of one of the clutches.

Figure 7 is a view in perspective, of the control for the ticket baskets.

Figure 8 is a view, in perspective, of the control for the lining up of the baskets and the printing wheels.

Figure 9 is a view, in perspective of the control for the ticket raising rake, for the tickets arranged in the baskets.

Figure 10 is a view in perspective of the control for the striker serving for the recording of weights and various references.

Figure 11 is a view in perspective of the devices for the direct reading of the weight with a rotary basket, a numbered card and inscription on a ticket or band of account of the date, weight, ticket number or weighing operation number (sheet indexer) and a seven digit number or letter group—(numberer).

Figure 11a is a view in perspective of the electrical contact mechanism which permits the scale reading to be transmitted to a location remote from the scale.

Figure 11b is a view, in perspective, of the hand numbering device.

Figure 12 is a view in perspective of the control of the reversing shaft and of the inverter controlling the double clutch and the movable release device.

Figure 14 is a front view corresponding to Figure 13.

Figure 15 is a view in perspective of the scale locking device.

Figure 17 is a view, in perspective, of the mechanical transmission allowing the control of a direct reading, double dial rotating device.

Figure 18 is a diagram of an electrical set up with a motor and mercury contactors for the winding of the apparatus, said device completing a variable time switch allowing a direct reading of the weights.

Figure 19 is a perspective view of a part of the mechanism, the different members of which are illustrated in the position occupied by them when the machine is completely assembled and is ready for a weighing operation.

Figure 20 is a perspective view of a part of the mechanism illustrating the relative disposition of the elements of Figs. 8, 9 and 13.

Figure 4A:
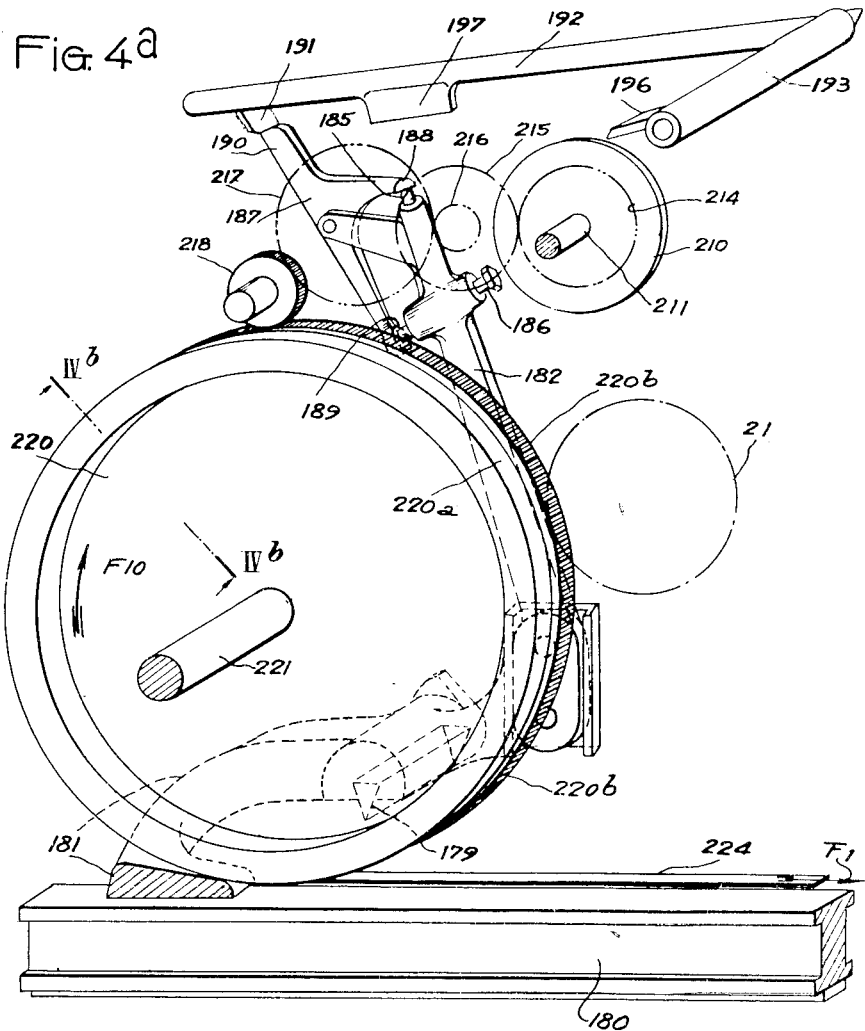
Figure 4a is a view, in perspective, of that portion of the machine comprising the movable release.
Figure 4B:
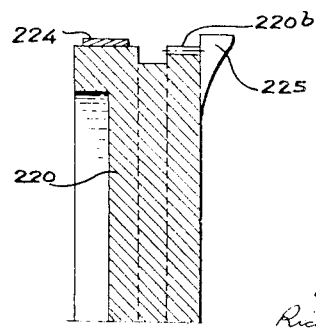

In Figs. 1 and 3, 1, 2 and 3, 4 designate the respective bearings for the shafts 5 and 6 (Fig. 5), said bearings being supported in flanges 7, 8 secured on the front and rear plates 9, 10 of the machine. The shaft 5 carries a central sleeve 11, keyed thereunto but capable of sliding to the left or to the right. This sleeve carries two collars 12, 13, on one side, and a collar 14 on the other side. Gear teeth 15, 16 are cut at the two ends 11a and 11b of the sleeve 11. The shaft 5 carries a second sleeve 17 mounted free thereon; the sleeve 17 offers, at its end 17a a portion having a diameter 18 larger than the sleeve 17, the edge of which, facing the central sleeve 11 is cut for forming gear teeth 18a which can engage the gear teeth 15 of the sleeve 11. 19 designates a pinion cut on the sleeve 17. A third sleeve 20, is mounted free on the shaft 5 and carries at its end 20a a pinion 21 and a portion having a larger diameter 22 the edge of which facing the edge of the central sleeve 11 is cut for forming gear teeth 22a capable of engaging the gear teeth 16 of the sleeve 11. The shaft 6 carries a cam 23, for the resetting of the locking device of the scale; the shaft 6 further carries a pinion 24 gearing with the pinion 19 of the sleeve 17. 25 designates the cam controlling a clutch locking device consisting of the clutch formed by engagement of gear teeth 18a of the sleeve 17 and 15 of the central sleeve 11. The cam 26 controls the return to the rest position of the baskets containing cards indicating at sight the load weighed by the scale.

27 designates a roller carrying on one side a cam 28 actuating an arm associated with an inverter shaft causing the sliding to right or left of the central sleeve 11. The cam 29 controls the device for the lining up of the baskets of cards indicating the weights and the printing wheels for this weight recording it on a ticket or an endless band. The cam 30 controls the raising device for the cards indicating at sight the weight of the object weighed on the scale. The cam 31 controls the striker device making it possible to print on a ticket or an endless band the weight of the object weighed on the scale and indicated by the above mentioned printing wheels.

In Figure 6, the shaft 32 is mounted in bearings 33, 34 (Figs. 1 and 3) this shaft carries an arm 35 offering, at its end 35a, an axle 36, on which a roller 37 is mounted free, always in contact with the cam 25, associated with the cam shaft 6. The shaft 32 carries, slightly at the rear of the arm 35 a second arm 38 ending in a finger 39 which is placed back of the collar 14 of the sleeve 11 when the roller 37 is on the circular portion of the cam 25. A spring 40, secured on the arm 38, tends to cause its pivoting backwards, this spring is attached to a cross-stay 41 secured at 42, 43 on the plates 9 and 10 (Figs. 1 and 3).

In Fig. 7, the axle 44 is secured at 45 and 46 on the plates 9 and 10 and goes through a hole 47 drilled in the central plate 48 (Fig. 2). A sleeve 49, passed over the axle 44 between the front plate 9 and the central plate 48 carries at its middle an arm 50, offering at its end 50a an axle 51 on which a roller 52 is mounted free, always in contact with the cam 26. The sleeve 49 carries two other arms 53, 54, connected at their upper ends by a cross piece 55 which is always in contact with the fingers 56 carried by the supports for baskets of weight indicating cards which shall be described later.

In Figure 8, the sleeve 57 is passed over the axle 44 between the central plate 48 and the back plate 10 (Figs. 2 and 3); this sleeve carries an arm 58 offering at its end 58a an axle 59 on which is mounted free a roller 60 always in contact with the cam 29. The sleeve 57 carries another arm 61 at the end of which is attached a stud 62 engaging a slot 63 provided at the end of a part 64 associated with a sleeve 65 passed over an axle 66 resting in bearings 67, 68 of the front and back plates 9 and 10.

The sleeve 65 carries a rake 69, for lining up the wheels for printing weights and other references; these wheels shall be described later. Two lugs 70, 71 associated with the rake 69 are connected through rods 72, 73 with a second rake 74 for lining up the supports of baskets for cards indicating at sight the weight of the goods placed on the scale. The rake 74 is secured on a sleeve 75 passed over an axle 76 resting in bearings 77, 78 of the front and back plates 9 and 10. 79, 80 designate two springs tending to lift the rake 74. These springs are secured on a cross piece 81 holding the front and back plates at 82, 83, (Figs. 1 and 3).

In Fig. 9, a sleeve 84 is passed over an axle 85, secured at 86, 87 in the central and back plates 48 and 10 (Figs. 2 and 3). The sleeve 84 carries an arm 88, the end of which 88a carries an axle 89 on which is mounted free a roller 90, always in contact with the cam 30. The sleeve 84 carries a second arm 91 connected through a rigid rod 92 with an arm 93, associated with a sleeve 94, passed over an axle 95, secured at 96, 97 on the front and back plates 9, 10, (Figs. 1, 3). The sleeve 94 is associated with a lever 98; the latter and the arm 93 support, at their ends, 98a and 93a a rake 99 with notches 99a, the function of which is to lift the cards indicating at sight the weight of the goods weighed by the scale, and to replace these cards in the baskets. 100, 100a, 100b and 100c are rollers, gliding inside guiding grooves 101 and 102 provided in the plates 9 and 10 (Figs. 1 and 3). The end 98b of the lever 98 is connected through a rod 98c with a hook 98d, pivoting about an axle 98e attached to the front plate 9. The hook 98d controls the pivoting of a mercury switch which will be mentioned later.

In Figure 10, the axle 103 is secured at 104, 105 in the flanges 7, 8 associated with the plates 9, 10 (Figs. 1 and 3). A sleeve 106, passed over the axle 103 carries two arms 107, 108 cross stayed by a rod 109 comprising a straight edge 110, constituting the striker of the device for printing weights and various references on tickets or on an endless band. An arm 111 secured on the sleeve 106, carries at its end 111a an axle 112 on which a roller 113 is mounted free, always in contact with the cam 31.

A second arm 114 is secured on the sleeve 106, a spring 115 is secured at the end of this arm on the one hand, and, on the other hand, on a cross-stay 316, placed at 317, 318 on the plates 9 and 10 (Figs. 1 and 3). The spring 115, working as a traction spring, applies the roller 113 firmly on the cam 31.

In Figure 11, the axle 116 is secured at 117, 118 in the plates 9, 10 (Figs. 1 and 3). A sleeve 119, passed over the axle 116, carries a part 120 at the upper portion of which the basket 121 is secured, containing cards 122 carrying figures 123. The cards 122 are supplied with bars 122d making it possible to seize them in the basket by means of the notches 99a on the rake 99. The upper portion of the part 120 comprises teeth 124. The sleeve 119 carries a feeler arms 125 then a second arm 126, placed in line with the arm 125 and ending in a toothed sector 127 gearing with a toothed wheel 128 associated with an engraved wheel 129. 130 designates a third arm associated with the two previous ones which carries a toothed sector 131 gearing with a toothed wheel 132 (Figure 11a) controlling an exploring arm 133 of a device for the distant transmission of weights and various references, which will be described later. The finger 56 is associated with arms 125, 126 and 130, (Figs. 11 and 11a). The part 120 is pulled back by a spring 134 attached to a cross-stay of the frame of the machine constituted by the two plates 9 and 10.

Figure 11 shows four card baskets comprising the same supports and the same connecting parts and control parts. These identical parts bear the same references, with indices a, b, c.

Similarly, the engraved wheels 129 bear the same references with indices a, b, c.

The wheels 129, 129a . . . 129c as well as the toothed wheels 128 which are their conjugates, are passed over an axle 135 secured in the front and back plates.

Figure 21:
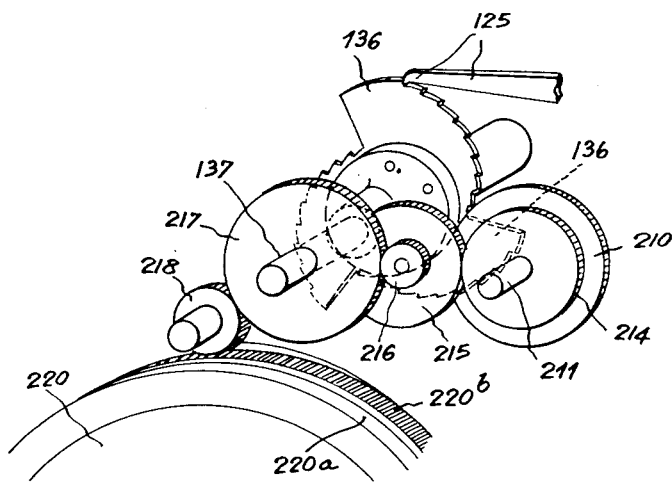
Figure 21 is a perspective view of a part of the mechanism illustrating how the structures of Figs. 4a and 11 are related.

136 designates a contoured cam mounted on an axle 137 which is part of a device comprising, in the example shown, four cams of various shapes (only one of which is shown), which are controlled by the mechanical weighing mechanism. Cams 136 are driven by the pinion 217 of the gear train 218, 217, 216, 215, 214 and are also associated with the development wheel 220 operating the weighing machine mechanism. This driving of cams 136 is effected by means of shaft 137 on which pinion 217 is mounted, as shown in Fig. 21.

In Figure 11a, the axle 140 is secured at 141, 142 in the front and back plates 9, 10 (Figs. 1 and 3), this axle carries a sector 143 in which are attached contact points 144 connected, on the one hand, by cables 145 with a current source, and, on the other hand, with a luminous table located any distance away, thus making it possible to transmit at a distance the weights of the goods weighed by the scale. The luminous table is constituted in the same manner as the device designed for the direct reading of the weight, a glass sheet being placed in front of the cards 122 and a source of light, for instance a lamp, being placed behind the cards 122. The figures 123 are cut out in the cards 122. The whole is enclosed in a casing.

The contact between the two blades constituting one of the contact points 144 is ensured by the exploring arm 133 associated with the toothed wheel 132. 146, 146a constitute supports acting as cross-stays and secured to the plates 9, 10.

As the machine comprises four baskets, it also comprises four groups of distant transmission elements which bear the same references, with indices, a, b, c.

In Figure 11b, the axle 147 carries a group of seven wheels engraved, 148, 148a . . . 148f each one of them associated with a toothed wheel 149, controlled, each one of them, by a rack 150 carried by a lever 151 associated with a sleeve 152 passed over an axle 153, secured on plates 9 and 10.

Each lever 151 carries a toothed sector 154, gearing with a countershaft 155 itself gearing with a toothed wheel 156 associated with an engraved wheel 157 carried by the axle 135. As there are seven wheels 148, there are seven engraved wheels 157 referenced with the indices a, b, . . . f.

The device shown in Figure 11b is the hand numbering device. The wheels 148 allow a visual checking of the desired references which are obtained by operating the levers 151, while the engraved wheels 157 print these references on tickets or endless bands. The device shown in Figure 11b may also comprise two groups of engraved wheels constituting the dater and two other groups of wheels constituting the sheet indexer. Reference is made to French Patent 806,554 issued May 16, 1936, for details of this known device.

In Figure 12, the roller 27, associated with the shaft 6 carries, on one of its sides, the cam 28. 160 designates a shaft which will be called an "inverter shaft" hereinafter; this shaft is supported at 161, 162 in the central plate 48; it carries a finger 163, the end of which 163a is provided with a roller 164 always in contact with the roller 27. The inverter shaft comprises a second finger 165. 166 designates an axle supported in two holes bored, respectively, in the finger 163 and in the finger 165; the axle 166 carries an arm 166a offering a stud 167 placed between the collars 12 and 14 of the sliding sleeve 11 (Figs. 4, 5). 168 designates a stop associated with the arm 166 which is always brought in contact with the finger 165 by a spring 168a. The inverter shaft carries, at its rear end, a fork 169 and an arm 170. The axle 171, supported at 172, 173 in the plates 9, 10 (Figs. 1 and 3) carries a V-shaped part 174, one branch of which 174a is terminated by an axle carrying a roller 175 placed between the branches of the fork 169; the axle 171 carries a second V-shaped part 176, the function of which will be explained later.

Figure 13:
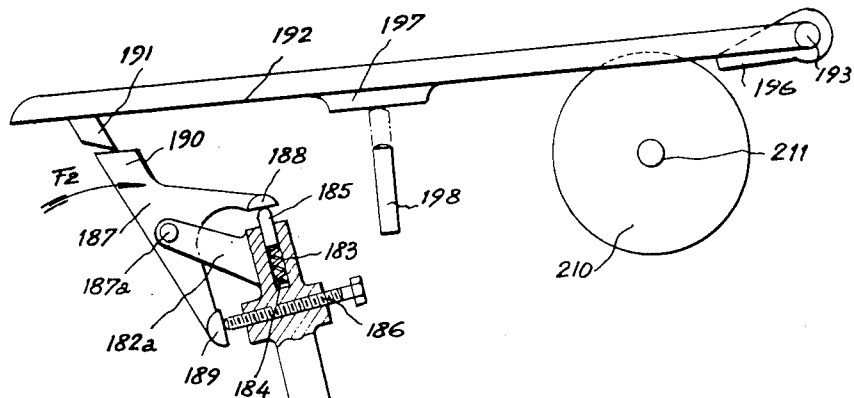
Figure 13 is a side elevation of the movable release device.

In Figure 13, 180 designates the scale beam and 181 a bracket associated with the beam, this assembly rests on a knife edge 179 bearing on a bracket of the scale frame, not shown. A lever 182, attached to the bracket 181, is drilled, at its upper portion with a blind hole 183, in which is housed a spring 184, pushing a piston 185. In addition, this lever carries an adjustable stop 186. 187 designates a part articulated at 187a on the lug 182a of the lever 182 and offering surfaces 188, 189, respectively in contact with the piston 185 and the adjustable stop 186; the part 187 comprises a finger 190 in contact with a stud, 191, associated with a rod 192, itself associated with an axle 193, supported at 194, 195 in the central plate 48 and back plate 10 (Figs. 2 and 3). 196 designates a catch secured on the axle 193. The rod 192 carries a heel 197 which cooperates with a finger 198 carried by a bent rod 199 attached on a shaft 200 (Fig. 12), supported by the front and back plates. The axle 200 carries, at its end 201 a fork 202 with three prongs, which control the pivoting of mercury switches which will be mentioned later (Figure 12).

In Figures 4a, 12, 13 and 14, there is shown a disc 210 mounted on a shaft 211 rotating in bearings 212, 213, secured on the central and back plates 48 and 10 (Figs. 2 and 13); this disc (Fig. 4a) may be associated, through a gear, not shown, with a gear train 214, 215, 216, 217, 218 setting up a connection with the wheel 220 called hereinafter a "development wheel," this wheel is mounted on a shaft 221 resting in bearings 222, 223, (Figs. 1 and 3). The development wheel 220 is comprised of a drum 220a, on which is attached and wound the tape 224 which is secured at its other end on the self sliding weight and of a pinion 220b gearing with the pinion 218. The cam 225 placed on the side of the pinion 220b controls the motion of the V-shaped part 176.

In Figure 15, a key 230 is articulated at 231 with a balance yoke 232, 233, which pivots about an axle 234, secured on the front plate 9 (Fig. 1); the arm 232 comprises a projection 235 cooperating with the tip 236 of a lever 237 attached on a shaft 238 supported by the plates 9 and 10 (Figs. 1 and 3); this shaft carries a catch 239 which a spring 240 tends to lift away from the disc 210. The lever 237 carries a tip 241 on which bears the end 242 of a lever 243 articulated at 244 on an axle secured to the front plate 9. The end 245 of the lever 243 is in contact with the cam 23 at the time of the final locking of the machine. 246 designates a rod, forming a plunger core for the electromagnet 247 which is articulated at 248 on the arm 232.

In Figure 17, the pinion 218, already represented in Figure 4a, is mounted on a shaft 250, supported by the central plate 48 and the front plate 9 (Figs. 1 and 2) this shaft carries a second pinion 251, gearing with a pinion 252 engaging the shaft 253 supported by the front and central plates like the shaft 250; the pinion 252, in connection with the pinions 254, 255, the shaft 256 and the pinion 257 transmit the motion to two pinions 258, 259, keyed on a shaft 260 mounted at 261, 262 on flanges 263, 264 secured on the plates 9 and 10 (Figs. 1 and 3); this shaft comprises on each side a multiplication gear train 265, 265a, 265b, 265c transmitting the motion to a pinion 266 associated with a sleeve 267 on which is attached a calibrated disc 268. 269 designates a fixed index, associated, for instance, with one of the plates 9, 10. This device, which is driven by the pinion 220b, associated with the development wheel 220 (Fig. 4a) allows a direct reading of the weights of the goods weighed on the scale.

Figure 18 shows an electrical wiring diagram of a motor 280 driving in rotation, by means of a suitable transmission, the shaft 5 (Fig. 5). 281, 282, 283 designate tipping mercury switches and 284 a switch, controlled, for example, by a rotating time switch carrying a cam not shown on the drawing. The pivoting of the switches 281 and 282 is controlled by a fork 202 (Fig. 12) while the pivoting of the switch 283 is controlled by the fork 98d (Fig. 9).

Figure 16:
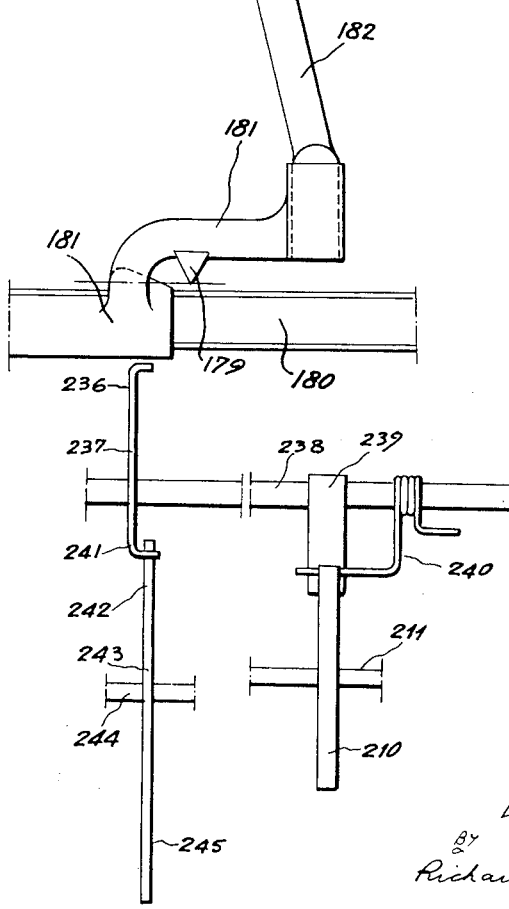
Figure 16 is a front view corresponding to Figure 15.

The automatic steelyard operates as follows:

The scale being at rest, the self-sliding weight (as described in U. S. Patent 2,615,705 issued July 11, 1947) is placed close to the development wheel on which the tape 224 is wound. The catch 239 (Figs. 15 and 16) is in contact with the disc 210 and locks the whole scale mechanism. The key 230 is in the position shown in Figure 15 as well as all parts shown on this drawing. When it is desired to effect a weighing operation, the operator presses on the key 230 or closes the power supply circuit for the electromagnet 247; the lever 232 pivots, releasing the arm 237. The spring 240 lifts the catch 239; the scale mechanism is unlocked and the self sliding weight moves along the beam 180 in the direction of the arrow $F_1$ (Fig. 4a) driving along the tape 224 which, in turn, drives in rotation the development wheel 220. The rotation of the development wheel 220 (Fig. 4a) drives the pinion 218 (Fig. 17) which, in turn, drives the whole device shown on this figure. When the slide weight stops there can be read directly on the dials 268, against the index 269, the weight of the good weighed on the scale.

With the beam 180 in its initial position prior to a weighing operation the elements are in the relative positions shown in Figures 13 and 14, in which the finger 190 supports the stud 191. When a weight is placed on the scale and the weighing operation is initiated, the lever 182 is pivoted in clockwise direction until the beam 180 is balanced. As a result of this movement of the lever 182, the finger 190 moves in the direction shown by arrow $F_2$ until it no longer supports the stud 191. The latter is therefore free to drop, pivoting counterclockwise about axle 193. Catch 196 which is connected with stud 191 through rod 192 therefore also moves in counterclockwise direction until it locks disc 210, thereby terminating further rotation of said disc.

When the weighing operation begins, the cam 225, carried by the development wheel 220 (Figs. 4a and 4b) has released the V-shaped part 176 which, by its own weight, causes a pivoting of the axle 171, and at the same time, the second V-shaped part 174, whose branch 174a, terminating in the roller 175, has caused a pivoting of the fork 169 in a clockwise direction.

The inverter shaft 160 follows the motion of the fork 169 and the motion is transmitted by the finger 165 to the arm 166 and finally to the stud 167 which causes a sliding of the sleeve 11 (Fig. 5) towards the left of the drawing. The gear teeth 15 engage the gear teeth 18. The sleeve 11 is thus associated with the sleeve 17.

The motion of the inverter shaft 160 caused the pivoting of the arm 170 downwards. The bent rod 199, by its own weight, has tipped about the axle 200, this motion has caused the tipping over of the fork 202 which tips the mercury switches 281, 282 so that the electric circuit they control is closed. Since the switch 283 is also closed, the motor 280 is energized and turns, as well as the time switch 400 controlling the switch 284. The motor 280, which is connected through a suitable transmission with the shaft 5 (Fig. 5) causes the latter to rotate. Since the sleeve 11 is keyed on the shaft 5, it is driven and since it is clutched on the sleeve 17 the latter is also driven. The pinion 19 transmits the motion to the pinion 24 driving the camshaft 6 in rotation in the direction of the arrow $F_3$ (Fig. 6).

The cam 25 (Figs. 5 and 6) by rotating, causes a pivoting of the arm 35 downwards about the shaft 32 which drives, in its motion, the arm 38, the finger 39 of which catches back of the collar 14 on the sleeve 11, thus locking the clutch engagement 15, 18.

The cam 26 (Figs. 5 and 7) by rotating, in the direction of the arrow $F_3$ lifts the arm 50 and causes a pivoting in the direction of the arrow $F_4$ of the parallelogram 49—53—54—55 thus pressing on the fingers 56 of the parts 120 carrying the card basket 121 (Fig. 11).

Rotation of the development wheel 220 drives pinion 218 which in turn drives pinion 217 and shaft 137 bearing cams 136 as shown in Fig. 21. During the weighing operation, the four cams 136 (Fig. 11) one of which only is shown, and which are controlled by the weighing device, have taken a position corresponding to the weight of the goods weighed on the scale. The cam 26, by rotating, releases the roller 52. The springs 134 (Fig. 11) pull back the parts 120 carrying the card baskets 121 until such time as the feeler arms 125 are in contact with the teeth of the cams 136 thus determining a position of the baskets 121 which corresponds to the weight of the goods being weighed in the scale.

Simultaneously with this operation, the toothed sectors 127 of the arms 126 gearing with the toothed wheels 128, bring the engraved wheels 129, 129a, 129b, 129c to a position corresponding to the numerical indication of the weights of goods being weighed on the scale, to be printed on the endless band or ticket.

In addition, at the same time as the two above operations, the toothed sectors 131, associated with the arms 125 and 126 and which gear with the toothed wheels 132, bring the exploring arms 133 opposite the contact points 144 (Fig. 11a) corresponding to the numerical indication of the weight of the goods being weighed on the scale. The hand numbering device (Fig. 11b) being suitably adjusted, indicates visually, on the wheels 148, 148a . . . 148f, the serial number of the weighing and places the wheels 157, 157a, . . . 157f correctly for the printing of this same serial number.

The cam 29 (Figs. 5 and 8) rotating in the direction of the arrow $F_3$ lifts the arm 58 and this motion causes the pivoting of the arm 61 towards the rear of the drawing. The stud 62 causes the pivoting of the part 64 clockwise; the latter part drives in the same motion the lining up rake 69 which correctly blocks the wheels 129 . . . 129c, printing the weight of the goods weighed on the scale and the wheels 157 . . . 157f printing the serial number of the weighing operation (Fig. 11). At the same time the rake 74 is driven in the same motion by the rods 72, 73 and it correctly lines up the parts 120 supporting the card baskets 121.

The cam 30 (Figs. 5 and 9) by rotating in the direction of the arrow $F_3$ causes the arm 88 to pivot by its own weight towards the front of the drawing, which drives the arm 91 in the direction of the arrow $F_5$. This motion causes the rake 99 to move down along the guiding grooves 101, 102. The rake 99 seizes the cards 122 . . . 122c, and, since the cam 30 continues its rotation, it causes the pivoting of the arm 88 towards the rear of the drawing, which drives the arm 91 in an opposite direction to the arrow $F_5$. The rake 99 on coming up, lifts the cards 121 out of their basket (Fig. 11).

The cam 31 (Figs. 5 and 10), by rotating at the same time as the previous ones, in the direction of the arrow $F_3$ causes the pivoting of the arm 111 in a clockwise direction. The striker 109 moves down in the direction of the arrow $F_6$ and the arm 114 stretches the spring 115. When the contour of the cam 31 becomes concave, suddenly, the striker rises suddenly and violently and strikes the endless band or ticket just under the engraved wheels 129 . . . 129c and 157 . . . 157f (Figs. 4, 11, 11b) thus printing the weight of the goods weighed on the scale and the serial number of this weighing operation.

On coming up, the arm 98 which cooperates with the rake 90 transmits the motion to the hook 98d, which causes a pivoting of the switch 283 (Fig. 18). The power supply current for the motor 280 is cut off and the latter stops. There is thus obtained a dead time during which the cards 122 . . . 122c are visible as well as the figures transmitted by the distant indicator (Fig. 11a). But the time switch controlling the switch 284 has kept up its rotation and its cam causes a new tipping of the switch 283. The motor 280 is again energized and rotates. The cam 30, by still rotating, causes a new pivoting of the arm 88 towards the front of the drawing which drives the arm 91 in the direction of the arrow $F_5$. This motion causes the rake 99 to move down along the grooves 101, 102. The cards are then placed back in the baskets 121 . . . 121c. Similarly, the distant transmission of the indication of the weight of the goods weighed on the scale ends.

The cam 29 continued its rotation and the lining up rakes 69 and 74 move up under the actions of the springs 79, 80 to take their rest positions.

The same thing occurs for the cam 26 which reaches its lower portion 26a (Fig. 7). The parts 120, carrying the baskets 121 are pulled back to their rest positions by the springs 134 (Fig. 11). The wheels 129 . . . 129c are set to zero by the same operation. The roller 37 (Fig. 6) has reached the concave portion of the cam 25 and the arm 38, carrying the locking finger 39 is called back by the spring 40. The clutch engagement 15, 18 is no longer locked.

The roller 27 (Figs. 5 and 12) has been rotating at the same time as the shaft 6. The cam 28 carries, at that time the roller 164 and causes the pivoting of the inverter shaft 160 and its associated elements in the direction of the arrow F7. The effect of this motion is to cause the disengagement of the sleeve 11 with respect to the sleeve 17 and as the sliding motion from left to right, imparted by the cam 28 is completed by the action of the spring 168a acting on the arm 166a and the stud 167, this motion causes the clutching in of the teeth 16 between the teeth 22a. In addition the pivoting of the inverter shaft 160 lifts the arm 170 which causes a pivoting of the bent rod 199 which lifts, by means of the finger 198, the heel 197 associated with the rod 192, this motion causes a lifting of the catch 196. The scale weighing mechanism is free.

The motor then drives the pinion 21 (Fig. 5) through the engaged gear teeth 11b, 22a. The pinion 21, in turn, drives, in the direction of the arrow F10, the development wheel 220 (Fig. 4a) which drives back the self sliding weight in a direction opposite to the arrow F1 by means of the tape 224. The development wheel 220, rotating in the direction of the arrow F10, drives the pinion 218 (Fig. 17) which, in turn drives the entire device shown in this figure and brings back the zeros of the dials opposite the fixed indexes 269.

When the sliding weight arrives near the development wheel the beam 180 has pivoted upwards and the lever 182 has resumed the position shown in Figure 4a, as well as the part 187 (Figs. 4a, 13 and 14). The stud 191 again rests on the arm 190 of the part 187.

At the end of the run of the development wheel 220, the cam 225 (Fig. 4a), which is associated therewith, causes the pivoting of the V-shaped part 176 in a counterclockwise direction; the part 176, in turn, drives the V-shaped part 174 in this motion which in turn drives the inverter shaft 160 in the direction of the arrow F7 which, again causes a very slight lifting of the arm 170 and causes a pivoting of the bent rod 199. The axle 200 pivots slightly in a counterclockwise direction driving the fork 202 which causes the tipping of the mercury switches 281, 282. The power supply circuit for the motor is cut off and the motor stops.

Simultaneously with this latter operation, the cam 23 (Fig. 4a) comes and bears on the end 245 of the lever 243, the other end of which has caused the pivoting of the lever 237 the tip of which comes and engages the projection 235 of the arm 232. The motion of the lever 237 brings the catch 239 on the disc 210 which it locks. The locking device for the scale is again in position.

The scale is ready for a new weighing operation.

When the electric motor is not operating, the shaft 5 is driven by means of a crank secured on the end 5a of said shaft.

I claim:

1. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a camshaft having cams and receiving motion from the winding-up spindle through the medium of one element of said double clutch, and printing and indicating mechanisms operated by the cams of the camshaft, the other element of said clutch serving to return the steelyard to initial position.

2. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a primary camshaft having cams and receiving motion from the winding-up spindle through the medium of one element of said double clutch, a second camshaft having cams and driven by the weighing mechanism, sensing levers pivotally mounted, baskets controlled by the cams of said second camshaft through said sensing levers, toothed sectors placed at the tips of the sensing levers, and printing rollers used for the printing of the weights.

3. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a primary camshaft receiving motion from the winding-up spindle through the medium of one element of said double clutch, a cam on the primary camshaft, a roller operated by said cam, a first member associated with the roller, a second member associated with said first member, said second member displacing said sliding gear between said two elements of said double clutch under the action of said cam.

4. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a camshaft receiving motion from the winding-up spindle through the medium of one element of said double clutch, a lever pivotally mounted on said reversing member, a stud fixed on said lever, said stud operating said sliding gear of said double clutch, and a spring pushing said lever on said reversing member.

5. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle a primary camshaft having a cam and receiving motion from the winding-up spindle through the medium of one element of said double clutch, a second camshaft having cams and driven by the weighing mechanism, sensing levers pivotally mounted, baskets controlled by the cams of the second camshaft through said sensing levers, toothed sectors placed at the tips of said sensing levers, printing rollers used for the printing of the weights and a locking lever controlled by said cam on the primary camshaft for aligning and locking in position the rollers.

6. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a primary camshaft having a cam and receiving motion from the winding-up spindle through the medium of one element of said double clutch, a second camshaft having cams and driven by the weighing mechanism, sensing levers pivotally mounted, baskets associated with toothed sectors and controlled by the cams of the second camshaft through said sensing levers, toothed sectors placed at the tips of said sensing levers, printing rollers used for the printing of the weights, a locking lever controlled by said cam on the primary camshaft for aligning and locking in position the rollers, a second locking lever and a connecting rod positioned between the first and the second locking levers, said second lever aligning and locking the toothed sectors associated with the baskets.

7. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanisms when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a primary camshaft having a cam and receiving motion from the winding-up spindle through the medium of one element of said double clutch, a second camshaft having cams and driven by the weighing mechanism, sensing levers pivotally mounted, baskets associated with toothed sectors and controlled by the cams of the second camshaft through the sensing levers, toothed sectors placed at the tips of the sensing levers, printing rollers used for the printing of the weights, a locking lever controlled by said cam on the primary camshaft for aligning and locking in position the rollers, a second locking lever, a connecting rod positioned between the first and the second locking levers, said second locking lever aligning and locking the toothed sectors associated with the baskets, and a lever controlled by said cam on the primary camshaft and controlling said sensing levers for returning said baskets to their initial position.

8. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a primary camshaft receiving motion from the winding-up spindle through the medium of one element of said double clutch, a second camshaft having cams and driven by the weighing mechanism, sensing levers pivotally mounted, baskets controlled by the cams of said second camshaft through said sensing levers, first toothed sectors placed at the tips of said sensing levers, printing rollers used for the printing of the weights, a second toothed sector fixed on each sensing lever, a supporting member and a second toothed sector associated therewith and cooperating with said first sector, a switcher supported by said member, a series of leads controlled by said switcher, and indicators operating at a distance through said leads.

9. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium, a third pawl associated with the first pawl for locking the development wheel thereby stopping the weighing mechanism when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a primary camshaft receiving motion from the winding-up spindle through the medium of one element of said double clutch, two pairs of co-axial dials, and a stationary pointer placed in front of said co-axial dials, said latter being connected with the development wheel for indicating values of weights.

10. An automatic steelyard comprising a weighing mechanism including a pivoting weighing beam, a sliding weight disposed on said beam and releasably held thereon for sliding therealong, power means placed in the sliding weight to move said sliding weight along said weighing beam upon release of said weight, a tape secured at one of its ends to the sliding weight, a development wheel on which the second end of the tape is secured, said tape being wound around said development wheel, said development wheel being mounted for rotation about its axis and being operatively connected with said weighing mechanism for control thereof, said development wheel being driven by the sliding weight by means of the tape, a key operatively connected with said weight for release of the latter to thereby actuate the weighing mechanism of the steelyard, a further releasing device operated by the displacement of the beam while the latter is pivoting, a first pawl associated with the further releasing device, a second pawl associated with the beam, said second pawl normally engaging said first pawl and disengaging therefrom when the beam has reached equilibrium a third pawl associated with the first pawl for locking the development wheel thereby stopping the weighing mechanisms when the first pawl disengages from the second pawl, a double clutch including two elements and a sliding gear, a reversing member including means for selectively engaging said sliding gear with one of said two elements upon operation of said key, a winding-up spindle, an electric motor driving said spindle, a camshaft having cams and receiving motion from the winding-up spindle through the medium of one element of said double clutch, printing and indicating mechanisms operated by the cams of said camshaft, the second element of said clutch serving to return the steelyard to initial position, a cam fixed on the development wheel, a lever adapted to pivot under its own weight, said pivoting lever controlling the reversing member, two mercury switches controlled by said reversing members, an electric time switch, said two mercury switches and said time switch controlling said electric motor, and indicating printing means driven by said motor.

References Cited in the file of this patent

UNITED STATES PATENTS

| 1,157,716 | Outrebon | Oct. 26, 1915 |
| 1,344,339 | Foote | June 22, 1920 |
| 2,392,023 | Cooper | Jan. 1, 1946 |

FOREIGN PATENTS

| 663,170 | Great Britain | Dec. 19, 1951 |